United States Patent
Mori et al.

[11] 3,810,203
[45] May 7, 1974

[54] ELECTRICAL CONTROLS FOR CAMERA SHUTTERS

[76] Inventors: Chiharu Mori, 1, Oyama-cho, Itabashi-ku, Tokyo-to; Katsumi Ota, 8-14, Kamifukuoka 3-chome, Fukuka-machi, Iruma-gun, Saitama-ken; Hideaki Togawa, 12-21, Yayoi-cho, 4-chome, Nakano-ku, Tokyo-to, all of Japan

[22] Filed: Nov. 24, 1972

[21] Appl. No.: 309,095

Related U.S. Application Data
[63] Continuation-in-part of Ser. No. 117,000, Feb. 19, 1971, abandoned.

[52] U.S. Cl. ............................................. 95/10 CT
[51] Int. Cl. ............................................. G03b 7/08
[58] Field of Search ...................... 95/10 CE, 10 CT

[56] References Cited
UNITED STATES PATENTS
3,535,530  10/1970  Cooper et al. ...................... 95/10 X
3,533,348  10/1970  Yanagi et al. ...................... 95/10 X FOREIGN PATENTS OR APPLICATIONS
18,672  8/1969  Japan ................................... 95/10

OTHER PUBLICATIONS
G. E. Transistor Manual, 7th Ed., 1964, pp. 114 to 116.

*Primary Examiner*—Samuel S. Matthews
*Assistant Examiner*—Michael L. Gellner
*Attorney, Agent, or Firm*—Steinberg & Blake

[57] ABSTRACT

An electrical system for controlling the operation of a camera shutter. The system includes a shutter-operating circuit section controlled directly from a logarithmic expansion circuit section. A logarithmic compression circuit section is provided for receiving light from the object which is to be photographed and for providing a given output. An emitter-follower circuit section is electrically connected between the logarithmic-compression circuit section and the logarithmic-expansion circuit section to receive the output from the former and to perform certain computations determining the input to the latter. A variable resistor means is operatively connected as a load resistance to the emitter-follower circuit section in order introduce into the computations exposure-determining factors in addition to the light at the object. This variable resistor means has a resistance value which changes in accordance with an index function according to the additive APEX system in relation to given conditions such as the diaphragm setting or film speed.

8 Claims, 6 Drawing Figures

INVENTORS
CHIHARU MORI
KATSUMI OTA
BY HIDEAKI TOGAWA
ATTORNEYS

3,810,203

ELECTRICAL CONTROLS FOR CAMERA SHUTTERS

CROSS REFERENCE TO RELATED APPLICATION

The present application is a continuation-in-part of copending application Ser. No. 117,000 filed Feb. 19, 1971 and entitled Electrical System for Operating a Camera Shutter, now abandoned.

BACKGROUND OF THE INVENTION

The present invention relates to cameras.

In particular, the present invention relates to systems for controlling the shutter of a camera. As is well known, cameras can be provided with electrical circuits which will respond to the light at the object which is to be photographed as well as to certain additional exposure-determining factors, such as the setting of the diaphragm and the film speed, in order to determine automatically through computations which are carried out electrically, the exposure time, with this latter factor being provided by way of automatically maintaining the shutter open for an interval corresponding to the required exposure time.

There are several known methods and circuits for making such photographic computations. Among these is a known system where two outputs, one from a light-measuring section and the other from a section set according to the aperture and film speed are differentially operated through the medium of a suitable equilibrium type of circuit arrangement so as to carry out the photographic operations. The light-measurement section may include a photoconductive element and logarithmic-compression elements while the other output has the diaphragm setting and film speed values set with a logarithmic-compression diode and a variable resistor.

There is also a known system according to which two similar outputs are provided in order to operate differentially with respect to each other so as to carry out the photographic computations. With this latter known system the one output is also derived from the light at the object through a photoconductor and logarithmic-compression elements, while the other output has the diaphragm setting and film speed values adjusted so as to develop a linear voltage variation in accordance with variations in the diaphragm setting and film spped values.

These known systems have not proved to be satisfactory in practice. They require exceedingly complex circuits, and in addition the operation of the circuits is rendered unstable because of a lack of uniformity in the operating characteristics of the circuit elements, particularly a lack of uniformity in the temperature characteristics. These drawbacks have seriously limited the capability of providing a high manufacturing output for such networks.

SUMMARY OF THE INVENTION

It is accordingly a primary object of the present invention to provide an electrical system which will avoid the above drawbacks.

In particular, it is an object of the present invention to provide an electrical system which will have a high degree of stability in its operation, particularly with respect to the temperature characteristics.

Furthermore, it is an object of the present invention to provide an electrical system of the above type which is exceedingly simple and can have a high manufacturing output with a corresponding relatively low cost.

According to the invention, the electrical system for operating the camera shutter includes a shutter-operating circuit means which is operatively connected directly with shutter components so as to open and close the shutter in order to achieve a predetermined exposure time. A logarithmic-expansion circuit means is electrically connected with the shutter-operating circuit means to control the latter. A logarithmic-compression circuit means is provided for responding to the light at the object which is to be photographed. Electrically connected between the logarithmic-expansion circuit means and the logarithmic-compression circuit means is an emitter-follower circuit means for carrying out computations, and this latter circuit means is operatively connected with a variable resistor means which introduces into the computations, as a load resistance on the emitter-follower circuit means, exposure-determining factors in addition to the light at the object, these additional factors being such factors as the diaphragm setting and the film speed. The logarithmic-compression circuit means includes a photoconductor and logarithmic-compression elements coupled together so as to transform the exponent-functional variation of the light input from the object into a linear voltage variation. The load resistance of the emitter-follower circuit means to which this linear voltage output is applied as an input into the emitter-follower circuit means is caused to vary in accordance with the setting of the diaphragm and the film speed, the photographic computations being based upon the Apex index number and carried out with the output current of the logarithmic-expansion circuit means to which the output voltage of the emitter-follower circuit means is applied as the input of the logarithmic-expansion circuit means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
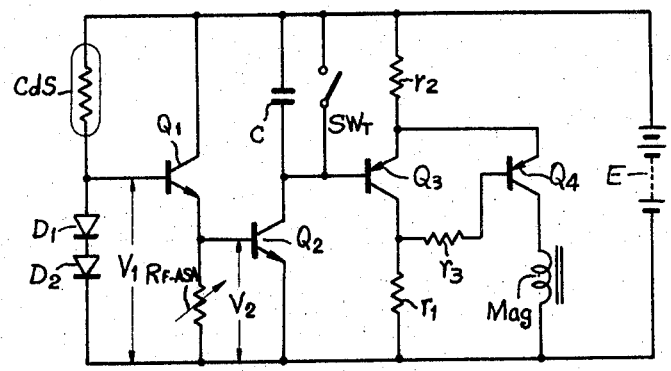
FIG. 1 is a wiring diagram of one embodiment of an electrical system according to the invention.

Referring now to the embodiment of the invention which is illustrated in FIG. 1, the logarithmic-compression circuit means forms the light-measuring section which includes a photosensitive means in the form of a cadmium sulfide photoconductor CdS and logarithmic-compression components formed by the diodes $D_1$, $D_2$. This logarithmic-compression circuit means achieves an output voltage $V_1$ which is inversely proportional to the logarithmic value of the internal resistance of the photoconductor CdS determined with the light received from the object. This output voltage $V_1$ is obtained as a potential difference across the terminal of the logarithmic-compression of elements $D_1$, $D_2$.

This output is supplied as the input to an emitter-follower circuit means which in the embodiment of FIG. 1 includes a transistor $Q_1$. This emitter-follower circuit means forms the computation circuit section of the illustrated electrical system. A variable resistor means is connected to the emitter-follower circuit means as a load resistance thereof in order to introduce exposure-determining values in addition to the light as the object which is to be photographed. In the embodiment of FIG. 1 the variable resistor means takes the form of a variable resistor $R_{F,ASA}$, this variable resistor means being set in a well known manner in accordance with the setting of the diaphragm and the speed of the film which is in the camera. This emitter-follower circuit means will provide an output voltage $V_2$ as a linear variation in response to the exponent-functional variation in the resistance value of the variable resistor means $R_{F,ASA}$, as a result of the diode action across the base and emitter of the transistor $Q_1$.

This output voltage $V_2$ is applied as the input voltage to the logarithmic-expansion circuit means formed by the transistor $Q_2$.

A charging current suitable for timing purposes can be obtained as a collector current of the logarithmic-expansion transistor $Q_2$, by properly selecting, so that they have a given relationship with respect to each other in accordance with a given Apex index number, characteristics such as the logarithmic-expansion characteristics of the transistor $Q_2$ in the logarithmic-expansion section to which the output voltage $V_2$ is applied, the output voltage characteristic of the light-measurement section determined by the photoconductor CdS and the logarithmic-compression elements $D_1$, $D_2$, and the output voltage characteristic of the computation section determined by the characteristics of the transistor $Q_1$ and the variable resistor $R_{F,ASA}$. With such a proper selection, so that these characteristics bear a relationship to each other in accordance with the Apex index number, the change-over levels of the Schmitt circuit forming the shutter-operating circuit means will provide a proper exposure time.

Thus, in the illustrated example this shutter-operating circuit means includes a timing capacitor C, transistors $Q_3$ and $Q_4$, resistors $r_1$, $r_2$, $r_3$ and an electromagnet Mag. The power is supplied to the entire circuit from a suitable voltage source E. As is known with shutter-controlling circuits of this type, the timing switch $SW_T$ is initially closed in preparation for making an exposure, and then it is switched to the open position so that the timing capacitor C will be charged with the current from the logarithmic-expansion transistor $Q_2$. The shutter is held open in a known manner by the electromagnet Mag, and when the latter becomes deenergized, after an interval determined by the charge on the timing capacitor C, the shutter is release to assume its closed position, thus terminating the exposure. The electromagnet Mag is actuated in this way in response to the change-over of the trigger circuit after the timing charge has been applied to the capacitor C. This type of Schmitt circuit for determining the time during which the shutter remains open in accordance with the charge on the timing capacitor is in itself known.

In the embodiment of FIG. 1, the temperature characteristics of the logarithmic-compression components $D_1$, $D_2$ and the temperature characteristics of the computation and logarithmic-expansion transistors $Q_1$, $Q_2$ cancel each other out. In this way it becomes possible to achieve through an exceedingly simple system an electrical shutter-control which will have a high stability of operation, with the operation of the circuit depending to an extremely small degree on temperature variations.

Figure 2:
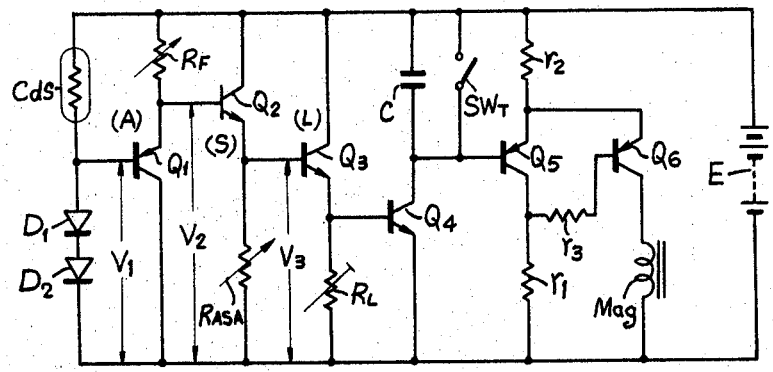
FIG. 2 is a wiring diagram of a second embodiment of an electrical system according to the invention.

In the embodiment of the invention which is illustrated in FIG. 2, the computations are carried out with an emitter-follower circuit means having separate sections which operate respectively in accordance with the diaphragm setting and the film speed setting, these sections including two emitter-follower circuits which are connected in cascade one after the other, these circuits respectively including the transistors $Q_1$ and $Q_2$ which have counter-connected polarities. The variable resistor means is provided in this embodiment by a pair of separate variable resistors $R_F$ for introducing the setting of the diaphragm and $R_{ASA}$ for introducing the value of the film speed. The resistor $R_F$ forms a variable resistor providing a load resistance for the transistor $Q_1$, while the variable resistor $R_{ASA}$ forms a variable load resistance for the transistor $Q_2$. The basic principle of operation, however, of the embodiment of FIG. 2 is similar to that of FIG. 1.

In the light-measurement cicruit section made up of the photoconductor CdS and the logarithmic-compression elements $D_1$, $D_2$, there is provided an output voltage $V_1$ which is in the form of a linear variation responding to the exponent-functional variation in the light input, as developed across the terminals of the logarithmic-compression components $D_1$, $D_2$. This output voltage $V_1$ is applied to the emitter-follower circuit section (A) comprising the transistor $Q_1$ which is electrically connected with the variable resistor $R_F$ for introducing the size of the diaphragm aperture. Utilizing a resistance value of the variable resistor $R_F$, according to the diaphragm setting, this diaphragm setting acts as a load resistance of the transistor $Q_1$, thus achieving an output voltage $V_2$ from the emitter-follower circuit section (A).

This output voltage $V_2$ is then applied to another emitter-follower circuit section (S) comprising the transistor $Q_2$ which is electrically connected with the variable resistor $R_{ASA}$, set according to the film speed. The resistance value of the variable resistor $R_{ASA}$, in accordance with the film speed, acts as a load resistance of the transistor $Q_2$, to provide an output voltage $V_3$ from the emitter-follower circuit section (S), and this is the output voltage of the computation circuit section.

However, this emitter-follower circuit means of FIG. 2 includes an additional emitter-follower circuit section (L) comprising a transistor $Q_3$ and a variable resistor $R_L$ in order to adjust the level of the output voltage $V_3$ to the input voltage level, and then this voltage is supplied to the logarithmic-expansion circuit means formed by the transistor $Q_4$.

In this case also there is a proper selection, so that they have a predetermined relationship in accordance with a given Apex index number, of characteristics such as the output voltage characteristic from the logarithmic-compression circuit means forming the light-measurement section and determined by the photoconductor CdS and the logarithmic-compression components $D_1$, $D_2$, the characteristics of the emitter-follower circuit section (A) determined by the characterics of the transistor $Q_1$ and the resistor $R_F$ for introducing the diaphragm setting, the characteristics of the emitter-follower circuit section (S) determined according to the characteristics of the transistor $Q_2$ and the variable resistor $R_{ASA}$ set according to the film speed, the logarithmic-expansion characteristic of the transistor $Q_4$ forming the logarithmic expansion circuit means, and the characteristics of the emitter-follower circuit section (L) determined by the transistor $Q_3$ and the variable resistor $R_L$ for adjusting the voltage level. With these properly selected characteristics there is obtained a charging current for timing purposes in the form of a collector current of the logarithmic-expansion transistor $Q_4$, and this current operates in precisely the manner described above in connection with FIG. 1 in order to control the shutter-operating circuit means which in the embodiment of FIG. 2 is identical with that of FIG. 1.

The extent to which the operation of the embodiment of FIG. 2 depends upon temperature variations is exceedingly low because the temperature characteristics of the logarithmic-compression components $D_1$, $D_2$ and those of the transistors $Q_1$, $Q_2$, $Q_3$, $Q_4$ in the computation circuit and in the logarithmic expansion circuit cancel each other out. In this way it is possible to achieve a high stability of operation in control of the shutter. With this embodiment of the invention an exceedingly high rate of manufacturing production of the illustrated network can be achieved by mass production techniques because the lack of uniformity in the base-emitter voltage of the several transistors and in the light-resistance characteristics of the photoconductor can be readily adjusted by proper selection of the resistance value of the variable resistor $R_L$.

As is apparent from the above description, with the electrical systems of the present invention all photographic computations are carried out by changing the load resistance of the emitter-follower circuit which itself is a type of voltage-feedback circuit. In this way an electrical shutter control system having an exceedingly high operative stability and the possibility of a high manufacturing output are achieved with exceedingly simple circuits.

Figure 3:
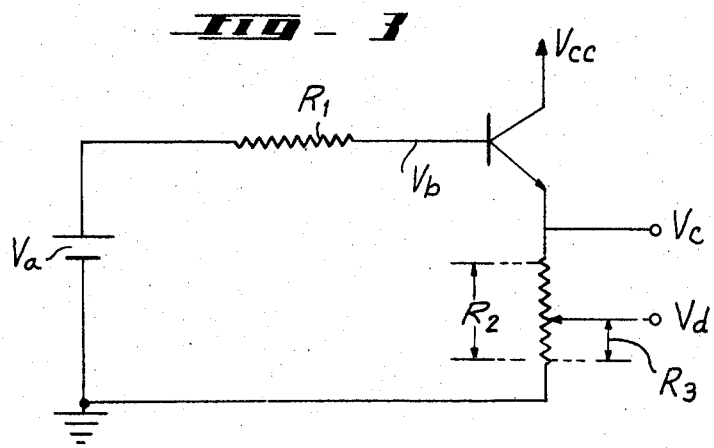
FIG. 3 is a diagrammatic representation of the operation of the load resistance of the emitter-follower circuit means, in accordance with the present invention.
Figure 4:
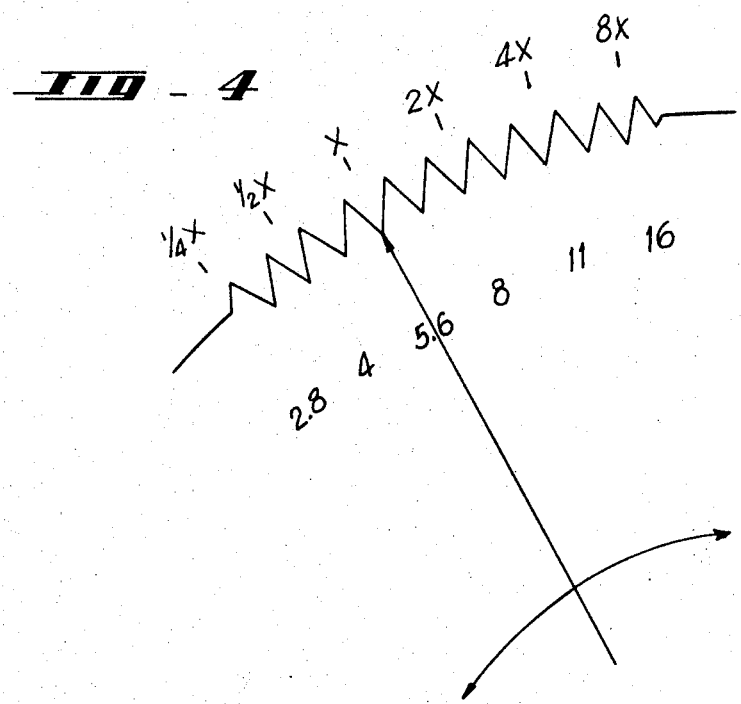
FIG. 4 is a schematic representation showing in detail how the resistance value of the load resistance of the emitter-follower circuit means changes with different changes in the diaphragm settings.

FIGS. 3 and 4 illustrate in detail the manner in which the emitter resistance $R_{F,ASA}$ of FIG. 1 operates, although it is to be understood that the variable resistors $R_F$ and $R_{ASA}$ of FIG. 2 operate in precisely the same way, as will be apparent from the discussion which follows. Thus, referring to FIG. 3 it will be seen that the emitter resistance $R_2$ of FIG. 3 corresponds to the variable resistor $R_{F,ASA}$ of FIG. 1. This emitter resistance $R_2$ of FIG. 3 is shown connected electrically to the emitter of the illustrated transistor which is connected into the illustrated circuit while connected to the voltage source $V_{cc}$. The input voltage of the $V_a$ is indicated in FIG. 3 as well as the base resistance $R_1$ and the resistance $R_3$ between the intermediate point in the emitter resistor and ground. Also, FIG. 3 indicates the base voltage $V_b$, the emitter voltage $V_c$, and the voltage $V_d$ at the intermediate point in the emitter resistor.

The properties of the emitter follower circuit illustrated in FIG. 3 are as follows:

1. Input and output resistance properties
   i. Input resistance: $R_{in} \approx \beta R_2$ ($\beta$: Currency amplification ratio)     (A)

ii. Output resistance: $R_{out} \approx R_1/\beta$ ($V_c$ = output voltage)     (B)

2. Relationship between Input Voltage and Output Voltage (Direct Currency Level)

$$V_c = V_b - V_{BE} \approx V_a - 1/\lambda \, (\ln V_o - \ln R_2)$$

(C)

$V_{BE}$ : Voltage between the base and the emitter
$\lambda$ : Constant that is specific to the transistor
$V_o$ : Average value of $V_c$ (constant)
$$V_d = (R_{3v}/R_2) c \quad (D)$$

3. Relationship between the input voltage and the output voltage (variation)
From the formula (C)

$$\delta V_c = \delta V_a \, (G \approx 1) \, (G \text{ is the voltage } d_B)$$

(E)

From the formula (D)

$$\delta V_d \approx R_3/R_2 \, \delta V_c \, (G = R_3/R_2)$$

(F)

4. Relationship between emitter resistance and emitter voltage (variation)
From the formula (C)

$$\delta V_c = 1/\lambda \, (\delta R_2/R_2)$$

(G)

The system illustrated in FIGS. 1 and 2 can be applied either to a camera where the receiving of the light is interrupted when the reflector or mirror swings up in connection with exposure of the film, so that with such a system the light is measured after having travelled through the objective of the camera. However, the system is also fully applicable with arrangements where the camera has at its front wall, for example, a window through which light reaches the photosensitive means. Thus, the system of the invention can be used with both types of light measurement.

The present invention relates to the means for treating the information relating to the brightness of the light at the object to be photographed, and therefore the manner in which this light reaches the photosensitive means is immaterial to the present invention. Of course, in addition to the information with respect to the brightness of the light with the present invention there is also a treatment of the information corresponding to the diaphragm setting and the speed of the film. These latter factors are introduced by way of the setting of the variable resistor. According to the present invention advantage is taken of the function of the transistor $Q_1$.

With the present invention the logarithmically compressed signal corresponding to the brightness of the object to be photographed is transmitted to the base of the transistor $Q_1$, and the emitter thereof is connected to the variable resistor $R_{F.ASA}$ which is adjusted in accordance with the diaphragm setting and film speed, this being the resistor $R_2$ shown in FIG. 3. Referring to FIG. 3, the emitter voltage $V_c$ varies in proportion to the algebraic sum of the logarithmically compressed signals of brightness of the object to be photographed, diaphragm setting and film speed. With the present invention the voltage $V_c$ is the result to be obtained since this is the voltage which corresponds to the latter algebraic sum. Thus, by way of this voltage $V_c$ the algebraic sum of light intensity at the object to photographed, diaphragm setting, and film speed are introduced into the computations.

In general, emitter-follower circuits may be used for purposes such as (1) an impedance varying circuit (a buffer circuit), (2) a level-shift circuit, and (3) a circuit for control of voltage variation (control of utilized voltage). The emitter follower circuit has properties as indicated above. In case (1), the properties of the formulas (A) and (B) are utilized. In case (2) the properties of the formulas (C) and (D) are utilized, while in case (3) the properties of formula (F) is utilized.

However, for the circuit of the present invention the properties shown by the above formulas (E) and (G) are utilized. According to the present invention, in the transistor circuit according to formula (G) the emitter resistance $R_2$ is adjusted in accordance with the diaphragm setting and film speed. As is indicated in FIG. 4, the change in the resistance value is determined in such a way that this latter value doubles or is reduced by half whenever the above values such as the value of the diaphragm setting and/or the film speed change by one step. Thus, as may be seen from FIG. 4 if the variable resistor $R_2$ is set according to a diaphragm aperture 5.6, there will be a given resistance value $x$. When going to the next setting 8, the resistance will be $2x$. In the other direction when going to the setting 4, the resistance is $1/2x$, and so on as indicated in FIG. 4. The change in the setting of the variable resistor also satisfies the conditions of formula (G) above. Consequently the voltage $V_c$ will change to a predetermined extent for example by 0.2V, in accordance with each change in the setting of the variable resistor. Thus, each time the variable resistor is set as by moving the diaphragm setting from one diaphragm setting to the next diaphragm setting, the resistance value either is doubled or is halved and the voltage $V_c$ will change correspondingly by an amount, for example, of 0.2V. The voltage $V_c$ also changes in accordance with the input voltage $V_a$ because of the properties indicated by the formula (E) above. The combination of the formulas (G) and (E) provides the following:

$$\delta V_c \approx \delta V_a + 1/\lambda\ (\delta R_2/R_2)$$

(H)

n.b. ($\approx$) nearly equal

In the above formula, $\delta V_a$ is a logarithmically compressed signal.

The resistance value $R_2$ doubles or halves when the value of the diaphragm setting and film speed changes by one step, and thus the following formula is satisfied:

$$R_2 = R_o\ e\ \delta\ ^{(SV\ -\ AV)}$$

(J)

In the above formula $\gamma$ is a constant based on the property of the resistance element itself.

SV is an Apex index of the photosensitivity value (ASA) of the film to be used.

AV is an Apex index of diaphragm value (F).

$R_o$ is an emitter value when $S_v$ is $A_v$.

Thus, in accordance with the present invention it is possible for the circuit to obtain logarithmically compressed signals of diaphragm setting and film speed and at the same time carry out operations to obtain the algebraic sum of the logarithmically compressed signals of brightness of the object to be photographed and the film speed, respectively. The following formulae prove that the above operations can be made with the circuitry of the present invention.

$$\delta R_2 = \gamma\ R_o\ e\ ^{\delta\ (SV\ -\ AV)} . \delta(SV - AV)$$

(K)

The formulae (J) and (K) are combined in the following formula:

$$\delta\ R_2/R_2 = \gamma\ \delta\ (SV - AV)$$

(L)

Since $V_a$ in the formula (H) is a logarithmic compression signal, the following formula is obtained from the formulae (H) and (L), when $V_a$ is replaced by V ($B_v$ is an Aprx index of brightness of the object photographed) and $T_v$ is determined in proportion to $V_c$ as shown by $V_c = T_v$.

($T_v$ is an Apex index of the exposure time).

$$\delta\ T_v = \delta\ B_v + \delta\ (SV - AV) = \delta\ B_v + \delta\ SV - \delta AV \therefore T_v = B_v + SV - AV$$

(M)

Thus, the duration of time required for film exposure is determined in accordance with the result of the computation according to the above formula (M).

Thus, in accordance with the present invention the relationship between the transistor $Q_1$ in the emitter-follower circuit, its base input and the emitter resistance form the features according to which it is possible to achieve the desired results. While in general the emitter-follower circuit appears similar to a conventional emitter-follower circuit, it actually operates quite differently from a conventional emitter follower circuit, since it is the variable resistor of this circuit that distinguishes the emitter follower circuit of the invention from a conventional emitter follower circuit. Thus, the emitter follower circuit of the invention may be considered as an emitter computation circuit. With this circuit the variable resistor $R_{F.ASA}$ of FIG. 1, and of course the corresponding circuit resistors of FIG. 2, change in accordance with the index function in relation to the condition for which the variable resistor is set such as the diaphragm setting and/or the film speed.

Figure 5:
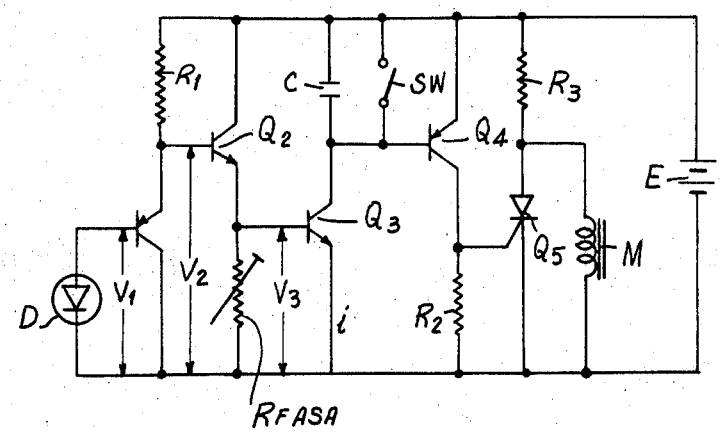
FIG. 5 is a wiring diagram of a third embodiment in accordance with the invention.

Referring now to FIG. 5, in this embodiment the light at the object which is to be photographed by a photogalvanic means D in the form of a photogalvanic element such as a silicon or selenium photocell. As is commonly known, the output voltage $V_1$ which is developed across the terminals of the photogalvanic means D is proportional to the logarithmic value of the brightness of the light at the object which is to be photographed.

This output voltage $V_1$ is applied as an input voltage to an emitter-follower circuit in the form of a high input and low output resistance type buffer circuit means made up of a transistor $Q_1$ and a resistor $R_1$. The output voltage $V_2$ from this latter emitter-follower circuit is proportional to the logarithmic value of the light intensity at the object. Thus, this buffer circuit means may be regarded as a constant voltage source.

This output voltage $V_2$ is applied as the input to the emitter-follower circuit means of the invention which is provided for carrying out computations as described above and which thus forms the computation circuit section of the system of the invention. This emitter-follower circuit means whose input is formed by the voltage $V_2$ comprises the transistor $Q_2$ and a variable resistor $R_{F.ASA}$ of FIG. 5. This latter resistor forms a variable resistor means operating as a load resistance of the emitter-follower circuit means. The variable resistor means $R_{F.ASA}$ of FIG. 5 is set according to the diaphragm setting and film speed. The emitter-follower circuit means formed by the transistor $Q_2$ and the variable resistor means $R_{F.ASA}$ achieves an output voltage $V_3$ which has a linear variation in response to the exponent-functional variation in the resistance of the variable resistor means $R_{F.ASA}$ due to the diode action across the base and emitter of the transistor $Q_2$. This voltage $V_3$ forms the input voltage for the logarithmic-expansion circuit means formed by the transistor $Q_3$ of FIG. 5 which provides a charging current $i$ for the timing capacitor $C$ of the shutter-operating circuit means which includes, in addition to the timing capacitor $C$, a transistor $Q_4$, a semiconductor controlled rectifier $Q_5$, resistors $R_2$, $R_3$, and electromagnet M, the entire circuit being energized from the battery source E.

A suitable charging current $i$ for timing may be developed as the collector current of the logarithmic expansion transistor $Q_3$ by properly selecting, so that they form a predetermined relationship with respect to each other in accordance with a given Apex index number, such characteristics as the logarithmic expansion characteristic of transistor $Q_3$ included in the logarithmic-expansion circuit means to which the output voltage $V_3$ is applied as the input thereof, the output voltage characteristic of the light-measuring section determined by the photo-galvanic means D, transistor $Q_1$, and resistor $R_1$, and the output voltage characteristic of the computation circuit section or emitter-follower circuit means determined by the characteristics of the transistor $Q_2$ and the variable resistor $R_{F.ASA}$ adjusted according to the diaphragm setting and film speed value. Thus, by properly selecting these characteristics so that they bear a given relationship with respect to each other in accordance with a given Apex index number, the changeover level of the switching circuit which forms the shutter-operating circuit means will provide a suitable exposure time starting at the instant when the switch $S_W$ is moved from its closed to its open position upon opening of the shutter and terminating when the electromagnet M becomes deenergized through the change-over of the switching circuit after the timing capacitor C has been charged with the timing current $i$, this deenergizing of the electromagnet M resulting in release of the shutter-closing components so that the shutter automatically assumes its closed position at this instant.

With the embodiment of FIG. 5, the temperature operating characteristics or dependability of the photogalvanic means D and the transistor $Q_1$ of the buffer circuit means, on the one hand, and the temperature operating characteristics or dependability of the computation transistor $Q_2$ and logarithmic-expansion transistor $Q_3$, on the other hand, cancel each other out. It thus becomes possible to achieve through this exceedingly simple system an electric shutter control network which is influenced to an exceedingly small degree by temperature fluctuations so as to have a high stability of operation. The possibility of achieving a high manufacturing output with mass production techniques is enhanced with the structure of the invention because the lack of uniformity in the base-emitter voltage of each transistor, in the photogalvanic characteristic of the photogalvanic element, and in the electrostatic capacity of the timing capacitor are readily adjusted through proper selection of the resistance of the load resistor $R_1$ in the buffer circuit means.

As is apparent from the above description, with the system of FIG. 5 there is no requirement of a logarithmic compression circuit because use is made of a photogalvanic element to receive the light used for controlling the shutter. In this way all of the disadvantages peculiar to a conventional photoconductor such as a cadmium sulfide element can be eliminated. With the structure of the invention all of the photographic computations are made by changing the load resistance of the variable resistor means $R_{F.ASA}$ of the emitter-follower circuit means which itself is a type of voltage feedback circuit. Thus, with the simple circuit of the invention an electric shutter control system is provided which has a high operative stability and which can be readily mass produced with a high productivity.

Figure 6:
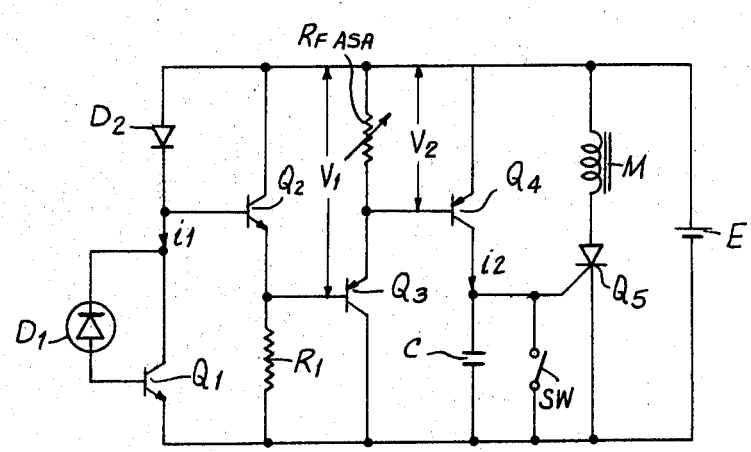
FIG. 6 is a wiring diagram of a fourth embodiment according to the invention.

Referring now to FIG. 6, as is commonly known, if a photogalvanic means, such as a silicon element $D_1$ (FIG. 6), is coupled with inverse bias across the collector and base of a transistor $Q_1$ of FIG. 6 for amplifying the photoelectric current, the output current $i_1$ from the transistor $Q_1$ will be nearly proportional to the light intensity at the object. This transistor $Q_1$ forms part of logarithmic-compression circuit means which also includes the logarithmic-compression element formed by the diode $D_2$ of FIG. 6, so that the output current $i_1$ is compressed logarithmically by the logarithmic-compression element $D_2$.

This logarithmically compressed output current is applied as the input to an emitter-follower circuit which includes the transistor $Q_2$ and fixed resistor $R_1$ of FIG. 6, these components forming a buffer circuit means which provides the output voltage $V_1$ which is proportional to the logarithmic value of the light intensity at the object. Thus, the buffer circuit means may be regarded as a constant voltage source.

This output voltage $V_1$ of FIG. 6 is received as the input to the emitter follower computation circuit means of the invention which includes the transistor $Q_3$ and the variable resistor means $R_{F.ASA}$, this emitter-follower circuit means carrying out computations which include factors of diaphragm setting and film speed introduced by suitable setting of the variable resistor $R_{F.ASA}$. This emitter-follower circuit means provides an output voltage $V_2$ and a linear variation in response to the exponent-functional variation in the resistance of the variable resistor $R_{F.ASA}$ due to the diode action across the base and emitter of the transistor $Q_3$.

The output voltage $V_2$ from the emitter-follower circuit means is applied as the input to a logarithmic expansion circuit means formed by the transistor $Q_4$ of FIG. 6. This transistor provides the charging current $i_2$ which is used to charge the timing capacitor C of a shutter-operating circuit means which is electrically connected to the logarithmic-expansion circuit means formed by the transistor $Q_4$.

Various operating characteristics of the circuit of FIG. 6 are selected so that they have with respect to each other a predetermined relationship in accordance with a given Apex index number, these characteristics including the logarithmic-expansion characteristic of the transistor $Q_4$ which forms the logarithmic-expansion circuit means to which the output voltage $V_2$ is applied as the input thereof, the output voltage characteristics of the light-measuring section determined by the light-receiving photogalvanic means $D_1$ and the amplifying transistor $Q_1$ as well as the logarithmic-compression element $D_2$, the transistor $Q_2$, and the resistor $R_1$, and the output voltage characteristics of the computation section of the circuit determined by the characteristics of the transistor $Q_3$ and the variable resistor $R_{F.ASA}$ which is set according to the aperture size and film speed value. Thus, a charging current $i_2$ for timing purposes is developed as a collector current of the logarithmic-expansion transistor $Q_4$.

As a result of proper selection of the above characteristics so that they have with respect to each other a relationship according to the Apex index number, the change-over level of the switching circuit which forms the shutter-operating circuit means and which includes the timing capacitor C will result in achievement of a proper exposure time.

This shutter-operating circuit means of FIG. 6 includes in addition to the timing capacitor C, a semi-conductor-controlled rectifier $Q_5$, an electromagnet M, and the timing control switch $S_W$, the entire circuit shown in FIG. 1 being supplied with energy from the battery E. The exposure time interval starts when the timing switch $S_W$ is automatically displaced from its closed to its open position by actuation of the shutter elements, the electromagnet M being automatically deenergized after the proper exposure time interval, so as to release the shutter components for again assuming automatically their closed position. This deenergizing of the electromagnet M is brought about by the change-over of the switching circuit after the capacitor C has been charged for timing purposes with the charging current $i_2$.

In the embodiment of FIG. 6, the temperature operating characteristics of the logarithmic-compression element $D_2$ and the transistor $Q_2$, on the one hand, and the temperature-operating characteristics of the computation transistor $Q_3$ and the logarithmic-expansion transistor $Q_4$, on the other hand, cancel each other out so that influences on operation due to temperature fluctuation is at a minimum. It is thus possible to achieve through this exceedingly simple network an automatic shutter control which will have its operation influenced to an exceedingly small degree by temperature fluctuations and which will have an exceedingly high stability operation. Moreover, with the network of FIG. 6 the possibility of a high rate of manufacturing output is greatly increased, especially with mass production methods, because the lack of uniformity in the base-emitter voltage of each transistor, in the photoelectric characteristic of the light-receiving element, and in the electrostatic capcity of the timing capacitor C are readily adjusted through proper selection of the resistance of the load resistor $R_1$ in the buffer-circuit means.

As described above, with FIG. 6 it is possible to achieve a high sensitivity of operation while eliminating all of the faults peculiarly inherent in a conventional photoconductor such as a cadmium sulfied element. This result is achieved with FIG. 6 by coupling a P-N junction type photodiode $D_1$ as the light receiving element in such a way that it is inversely biased across the collector and base of the transistor $Q_1$ for amplifying the photoelectric current. With this circuit the automatic control of the exposure time becomes possible when photographing either with natural light or with flash illumination. All of the photographic computations are made by changing the load resistance $R_{F.ASA}$ of the emitter-follower computation circuit means which in the embodiment of FIG. 6 includes the transistor $Q_3$ and which itself is a type of voltage feedback circuit. Thus, with the simple circuit of the invention it is possible to provide an electric shutter control network of high operating stability and having the capability of a high rate of manufacturing production by mass production methods.

What is claimed is:

1. In an electrical system for controlling a camera shutter, shutter-operating circuit means, logarithmic-expansion circuit means electrically connecting with said shutter-operating circuit means for controlling the operation thereof, photosensitive means for receiving light from the object to be photographed, logarithmic-compression circuit means electrically connected with said photosensitive means for logarithmically compressing signals from said photosensitive means, emitter-follower computation circuit means electrically connected between said logarithmic-compression circuit means and said logarithmic-expansion circuit means for performing computations on the output received from said logarithmic-compression circuit means and for forming an input to said logarithmic-expansion circuit means, and variable resistor conversion means coupled into an emitter circuit of said emitter-follower computation circuit means for introducing at least one additional exposure determining factor such as the setting of the diaphragm or the film speed and converting said factor into an exponential function whereby said computations performed by said emitter-follower circuit means includes the algebraic addition of the output from the logarithmic-compression circuit means and the additional exposure determining factor.

2. The combination of claim 1 and wherein said emitter-follower computation circuit means includes a single transistor and wherein said variable resistor conversion means includes a single variable resistor for introducing into the emitter circuit both the setting of the diaphragm and the film speed.

3. The combination of claim 1 and wherein said emitter-follower computation circuit means includes a pair of transistors connected in cascade one after the other and wherein said variable resistor conversion means includes a pair of variable resistors respectively connected in each of the emitter circuits for respectively introducing the factors of diaphragm setting and film speed.

4. The combination of claim 1 and wherein said variable resistor conversion means has a number of predetermined settings and provides at any two successive settings resistance values one of which is double the other.

5. The combination of claim 1 and wherein said logarithmic-compression circuit means includes logarithmic-compression components having given temperature characteristics and said logarithmic-expansion circuit means and said emitter-follower computation circuit means including transistors having given temperature characteristics, and the latter three circuit means being electrically connected to each other for providing a relationship according to which the latter temperature characteristics cancel those of the former temperature characteristics.

6. The combination of claim 1 and wherein an emitter-follower buffer circuit means is electrically connected between said logarithmic compression circuit means and said emitter-follower computation circuit means.

7. The combination of claim 1 and wherein said emitter-follower computation circuit means is directly connected between said logarithmic compression circuit means and said logarithmic expansion circuit means.

8. An electrical syytem for controlling a camera shutter including, photosensitive means for generating an electric current which is in proportion to intensity of light received from an object to be photographed, logarithmic-compression means comprising at least one logarithmic-compression element serially connected to said photosensitive means, logarithmic-expansion means for converting a linearly variable voltage into an electric current which varies in the form of an exponential function, timing circuit means for setting the shutter time in inverse proportion to said last-mentioned electric current, emitter-follower circuit means electrically connected between said logarithmic-compression means and said logarithmic-expansion means for performing computations for coordination therebetween, and variable resistance means coupled as a load resistance of said emitter-follower circuit means for converting a selected aperture value and a selected film speed value into an exponential function, whereby said emitter-follower circuit means provides said linearly variable voltage by combining the logarithmic compression values and the exponential function from the variable resistance means.

* * * * *